(12) United States Patent
Robinson et al.

(10) Patent No.: US 9,902,297 B2
(45) Date of Patent: Feb. 27, 2018

(54) LATCH MECHANISM WITH LOCKING FEATURE

(71) Applicant: Fisher & Company, Incorporated, St. Clair Shores, MI (US)

(72) Inventors: David L. Robinson, Sterling Heights, MI (US); David W. Milodrowski, Clinton Township, MI (US); Yuehui Zhu, Troy, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 126 days.

(21) Appl. No.: 14/733,278

(22) Filed: Jun. 8, 2015

(65) Prior Publication Data

US 2015/0360589 A1  Dec. 17, 2015

Related U.S. Application Data

(60) Provisional application No. 62/010,687, filed on Jun. 11, 2014.

(51) Int. Cl.
*B60N 2/20* (2006.01)
*B60N 2/235* (2006.01)

(52) U.S. Cl.
CPC .............. *B60N 2/236* (2015.04); *B60N 2/20* (2013.01); *B60N 2/2352* (2013.01); *B60N 2/2356* (2013.01); *B60N 2/2358* (2013.01)

(58) Field of Classification Search
CPC .. B60N 2/2356; B60N 2/2352; B60N 2/2358; B60N 2/20

USPC ................ 297/367 P, 367 R, 367 L
See application file for complete search history.

(56) References Cited

U.S. PATENT DOCUMENTS

| | | | |
|---|---|---|---|
| 2,941,583 | A | 6/1960 | Tischler et al. |
| 3,557,633 | A | 1/1971 | Frerichs |
| 3,731,342 | A | 5/1973 | Cousin |
| 3,807,797 | A | 4/1974 | Klingelhofer |
| 3,879,802 | A | 4/1975 | Werner |
| 3,958,828 | A | 5/1976 | Ishida et al. |

(Continued)

FOREIGN PATENT DOCUMENTS

| | | |
|---|---|---|
| CN | 1406788 A | 4/2003 |
| CN | 100480091 | 4/2009 |

(Continued)

OTHER PUBLICATIONS

Final Office Action in U.S. Appl. No. 12/855,427, dated Apr. 3, 2013.

(Continued)

*Primary Examiner* — Syed A Islam
(74) *Attorney, Agent, or Firm* — Harness, Dickey & Pierce, P.L.C.

(57) ABSTRACT

A latch mechanism is provided and may include a first plate, a second plate, a cam rotatably supported between the first plate and the second plate, and a plurality of pawls rotatably supported between the first plate and the second plate. The plurality of pawls are movable from an unlocked state to a locked state by the cam. The plurality of pawls each include a plurality of discrete locking members extending toward and received by respective notches formed in one of the first plate and the second plate.

22 Claims, 8 Drawing Sheets

(56) References Cited

U.S. PATENT DOCUMENTS

| | | | |
|---|---|---|---|
| 4,076,309 A | 2/1978 | Chekirda et al. |
| 4,082,352 A | 4/1978 | Bales et al. |
| 4,087,885 A | 5/1978 | Gillentine |
| 4,103,970 A | 8/1978 | Homier |
| 4,143,905 A | 3/1979 | Hensel et al. |
| 4,211,451 A | 7/1980 | Shephard |
| 4,345,792 A | 8/1982 | Shephard |
| 4,348,050 A | 9/1982 | Letournoux et al. |
| 4,457,556 A | 7/1984 | Klingelhofer |
| 4,457,557 A | 7/1984 | Une |
| 4,634,181 A | 1/1987 | Pipon |
| 4,770,464 A | 9/1988 | Pipon et al. |
| 4,813,853 A | 3/1989 | Otto et al. |
| 4,836,606 A | 6/1989 | Werner |
| 4,854,191 A | 8/1989 | Nagano |
| 4,997,223 A | 3/1991 | Croft |
| 5,161,856 A | 11/1992 | Nishino |
| 5,216,936 A | 6/1993 | Baloche |
| 5,267,918 A | 12/1993 | Shiroyama |
| 5,451,096 A | 9/1995 | Droulon |
| 5,462,498 A | 10/1995 | Lindblad |
| 5,531,504 A | 7/1996 | Schmale et al. |
| 5,590,931 A | 1/1997 | Fourrey et al. |
| 5,611,599 A | 3/1997 | Baloche et al. |
| 5,622,407 A | 4/1997 | Yamada et al. |
| 5,681,086 A | 10/1997 | Baloche |
| 5,685,611 A | 11/1997 | Eguchi et al. |
| 5,692,589 A | 12/1997 | Beguin |
| 5,718,481 A | 2/1998 | Robinson |
| 5,718,483 A | 2/1998 | Yamaguchi et al. |
| 5,749,624 A | 5/1998 | Yoshida |
| 5,755,491 A | 5/1998 | Baloche et al. |
| 5,762,400 A | 6/1998 | Okazaki et al. |
| 5,769,494 A | 6/1998 | Barrere et al. |
| 5,779,313 A | 7/1998 | Rohee |
| 5,785,386 A | 7/1998 | Yoshida |
| 5,788,325 A | 8/1998 | Ganot |
| 5,816,656 A | 10/1998 | Hoshihara et al. |
| 5,820,219 A | 10/1998 | Rohee |
| 5,871,414 A | 2/1999 | Voss et al. |
| 5,873,630 A | 2/1999 | Yoshida et al. |
| 5,881,854 A | 3/1999 | Rougnon-Glasson |
| 5,884,972 A | 3/1999 | Deptolla |
| 5,984,413 A | 11/1999 | Baloche et al. |
| 6,007,152 A | 12/1999 | Kojima et al. |
| 6,007,153 A | 12/1999 | Benoit et al. |
| 6,010,191 A | 1/2000 | Calinaud et al. |
| 6,023,994 A | 2/2000 | Yoshida |
| 6,024,410 A | 2/2000 | Yoshida |
| 6,039,400 A | 3/2000 | Yoshida et al. |
| 6,082,821 A | 7/2000 | Baloche et al. |
| 6,085,386 A | 7/2000 | Blanchard et al. |
| 6,092,874 A * | 7/2000 | Kojima ............... B60N 2/236 297/366 |
| 6,095,608 A | 8/2000 | Ganot et al. |
| 6,102,480 A | 8/2000 | Asano |
| 6,112,370 A | 9/2000 | Blanchard et al. |
| 6,120,098 A | 9/2000 | Magyar et al. |
| 6,142,569 A | 11/2000 | Kidokoro et al. |
| 6,149,235 A | 11/2000 | Fahim |
| 6,164,723 A | 12/2000 | Ganot |
| 6,224,157 B1 | 5/2001 | Di Luccio |
| 6,253,894 B1 | 7/2001 | Schumann et al. |
| 6,296,311 B1 | 10/2001 | Bonk et al. |
| 6,312,053 B1 | 11/2001 | Magyar |
| 6,318,805 B1 | 11/2001 | Asano |
| 6,325,457 B1 | 12/2001 | Matsumoto et al. |
| 6,325,458 B1 | 12/2001 | Rohee et al. |
| 6,328,382 B1 | 12/2001 | Yamashita |
| 6,328,383 B2 | 12/2001 | Rohee et al. |
| 6,332,649 B1 | 12/2001 | Vossmann |
| 6,364,413 B1 | 4/2002 | Rohee et al. |
| 6,390,557 B1 | 5/2002 | Asano |
| 6,402,249 B1 | 6/2002 | Rohee et al. |
| 6,439,663 B1 | 8/2002 | Ikegaya |
| 6,454,354 B1 | 9/2002 | Vossmann et al. |
| 6,464,298 B1 | 10/2002 | Hansel et al. |
| 6,474,734 B1 | 11/2002 | Masuda et al. |
| 6,474,740 B1 | 11/2002 | Kondo et al. |
| 6,520,583 B1 | 2/2003 | Bonk |
| 6,554,361 B2 | 4/2003 | Reubeuze et al. |
| 6,561,585 B2 | 5/2003 | Cilliere et al. |
| 6,568,759 B1 | 5/2003 | Hochmuth |
| 6,575,278 B1 | 6/2003 | Schumann et al. |
| 6,609,756 B2 | 8/2003 | Kojima et al. |
| 6,609,758 B1 | 8/2003 | Lefevere |
| 6,619,744 B2 | 9/2003 | Reubeuze |
| 6,626,495 B2 | 9/2003 | Okazaki et al. |
| 6,629,733 B2 | 10/2003 | Matsuura et al. |
| 6,634,713 B2 | 10/2003 | Nonomiya et al. |
| 6,640,952 B2 | 11/2003 | Baloche et al. |
| 6,641,217 B2 | 11/2003 | Yamada et al. |
| 6,648,414 B2 | 11/2003 | Ikegaya et al. |
| 6,666,515 B2 | 12/2003 | Asano et al. |
| 6,669,296 B2 | 12/2003 | Moriyama et al. |
| 6,669,297 B2 | 12/2003 | Cilliere et al. |
| 6,675,945 B2 | 1/2004 | Kim |
| 6,676,217 B2 | 1/2004 | Lange |
| 6,695,405 B2 | 2/2004 | Senseby et al. |
| 6,715,835 B2 | 4/2004 | Hoshihara et al. |
| 6,722,738 B2 | 4/2004 | Uramichi |
| 6,726,281 B2 | 4/2004 | Baloche |
| 6,733,077 B2 | 5/2004 | Asano |
| 6,742,844 B2 | 6/2004 | Pollack |
| 6,749,263 B2 | 6/2004 | Peters |
| 6,755,471 B2 | 6/2004 | Hoshihara et al. |
| 6,758,524 B2 | 7/2004 | Kisiel |
| 6,758,525 B2 | 7/2004 | Uramichi |
| 6,769,740 B2 | 8/2004 | Yamada |
| 6,786,550 B2 | 9/2004 | Uramichi |
| 6,799,806 B2 | 10/2004 | Eppert et al. |
| 6,820,937 B1 | 11/2004 | Esaki et al. |
| 6,824,216 B2 | 11/2004 | Uramichi |
| 6,830,298 B2 | 12/2004 | Koczewski |
| 6,843,533 B1 | 1/2005 | Miyata et al. |
| 6,854,802 B2 | 2/2005 | Matsuura et al. |
| 6,880,887 B2 | 4/2005 | Hoshihara et al. |
| 6,883,869 B2 | 4/2005 | Liu et al. |
| 6,890,034 B2 | 5/2005 | Bonk |
| 6,908,156 B1 | 6/2005 | Park et al. |
| 6,910,737 B2 | 6/2005 | Hosokawa |
| 6,910,738 B2 | 6/2005 | Bonk |
| 6,918,635 B2 | 7/2005 | Finner et al. |
| 6,923,504 B1 | 8/2005 | Liu et al. |
| 6,991,294 B2 | 1/2006 | Choi |
| 6,991,295 B2 | 1/2006 | Peters |
| 7,021,714 B2 | 4/2006 | Oki et al. |
| 7,021,715 B2 | 4/2006 | Umezaki |
| 7,055,906 B2 | 6/2006 | Shinozaki |
| 7,066,541 B2 | 6/2006 | Uramichi |
| 7,090,299 B2 | 8/2006 | Lange |
| 7,097,251 B2 | 8/2006 | Uramichi |
| 7,097,253 B2 | 8/2006 | Coughlin et al. |
| 7,100,986 B2 | 9/2006 | Uramichi et al. |
| 7,100,987 B2 | 9/2006 | Volker et al. |
| 7,114,778 B2 | 10/2006 | Schuler et al. |
| 7,140,686 B2 | 11/2006 | Rohee |
| 7,144,082 B2 | 12/2006 | Ohba |
| 7,150,503 B2 | 12/2006 | Ohba |
| 7,159,945 B2 | 1/2007 | Eppert |
| 7,165,813 B2 | 1/2007 | Tame |
| 7,168,764 B2 | 1/2007 | Reubeuze et al. |
| 7,188,905 B2 | 3/2007 | Ham |
| 7,195,318 B2 | 3/2007 | Cha et al. |
| 7,201,447 B2 | 4/2007 | Yamada |
| 7,204,555 B2 | 4/2007 | Thiel |
| 7,222,916 B2 | 5/2007 | De Wilde et al. |
| 7,222,919 B2 | 5/2007 | Uramichi et al. |
| 7,261,379 B2 | 8/2007 | Volker et al. |
| 7,303,499 B2 | 12/2007 | Klindworth |
| 7,334,843 B2 | 2/2008 | Yamada et al. |
| 7,341,311 B2 | 3/2008 | Ohba |
| 7,354,109 B2 | 4/2008 | Oki |
| 7,360,838 B2 | 4/2008 | Smuk |

(56) References Cited

U.S. PATENT DOCUMENTS

| | | | |
|---|---|---|---|
| 7,364,237 B2* | 4/2008 | Grable | B60N 2/20 297/367 R |
| 7,380,882 B2 | 6/2008 | Oki | |
| 7,380,883 B2 | 6/2008 | Koumura | |
| 7,404,604 B2 | 7/2008 | Nag et al. | |
| 7,407,230 B1 | 8/2008 | Luo et al. | |
| 7,416,255 B2 | 8/2008 | Yamada et al. | |
| 7,441,840 B2 | 10/2008 | Yamada et al. | |
| 7,458,639 B2 | 12/2008 | Thiel et al. | |
| 7,461,898 B2 | 12/2008 | Kojima | |
| 7,475,945 B2 | 1/2009 | Reubeuze et al. | |
| 7,478,881 B2 | 1/2009 | Leconte | |
| 7,517,021 B2 | 4/2009 | Wahls et al. | |
| 7,552,971 B1 | 6/2009 | Tarusawa et al. | |
| 7,563,049 B2 | 7/2009 | Peters | |
| 7,571,963 B2 | 8/2009 | Peters et al. | |
| 7,578,556 B2 | 8/2009 | Ohba et al. | |
| 7,588,294 B2 | 9/2009 | Matsumoto et al. | |
| 7,607,737 B2 | 10/2009 | Liebich et al. | |
| 7,614,700 B2 | 11/2009 | Peters | |
| 7,648,204 B2 | 1/2010 | Oki | |
| 7,669,931 B2 | 3/2010 | Tarusawa et al. | |
| 7,677,667 B2 | 3/2010 | Peters et al. | |
| 7,703,852 B2 | 4/2010 | Wahls et al. | |
| 7,722,121 B2 | 5/2010 | Fujioka et al. | |
| 7,758,124 B2* | 7/2010 | Kojima | B60N 2/206 297/367 R |
| 7,775,594 B2 | 8/2010 | Bruck et al. | |
| 7,850,243 B2 | 12/2010 | Sakamoto | |
| 8,128,170 B2 | 3/2012 | Cha et al. | |
| 8,162,400 B2 | 4/2012 | Mitsuhashi et al. | |
| 8,262,165 B2 | 9/2012 | Mitsuhashi | |
| 8,651,578 B2* | 2/2014 | Yamada | B60N 2/2356 297/367 P |
| 8,960,798 B2* | 2/2015 | Ito | A47C 1/025 297/366 |
| 9,004,601 B2* | 4/2015 | Higashi | A47C 1/024 297/367 L |
| 2002/0024246 A1 | 2/2002 | Yamada et al. | |
| 2002/0033627 A1 | 3/2002 | Hoshihara et al. | |
| 2002/0041119 A1 | 4/2002 | Kojima et al. | |
| 2002/0043852 A1 | 4/2002 | Uramichi | |
| 2002/0043856 A1 | 4/2002 | Ikegaya | |
| 2002/0096922 A1 | 7/2002 | Villaroel et al. | |
| 2002/0096923 A1 | 7/2002 | Uramichi | |
| 2002/0096924 A1 | 7/2002 | Reubeuze | |
| 2002/0096925 A1 | 7/2002 | Uramichi | |
| 2002/0125756 A1 | 9/2002 | Asano | |
| 2002/0171280 A1 | 11/2002 | Okazaki et al. | |
| 2003/0025376 A1 | 2/2003 | Moriyama et al. | |
| 2003/0067205 A1 | 4/2003 | Eppert et al. | |
| 2003/0085603 A1 | 5/2003 | Lee et al. | |
| 2003/0155800 A1 | 8/2003 | Asano | |
| 2003/0173810 A1 | 9/2003 | Lee et al. | |
| 2003/0178879 A1 | 9/2003 | Uramichi | |
| 2003/0214165 A1 | 11/2003 | Finner et al. | |
| 2003/0230923 A1 | 12/2003 | Uramichi | |
| 2004/0036337 A1 | 2/2004 | Hoshihara et al. | |
| 2004/0036338 A1 | 2/2004 | Lardais et al. | |
| 2004/0084945 A1 | 5/2004 | Toba et al. | |
| 2004/0145226 A1 | 7/2004 | Bonk | |
| 2004/0145227 A1 | 7/2004 | Bonk | |
| 2004/0195889 A1 | 10/2004 | Secord | |
| 2004/0195890 A1 | 10/2004 | Liu et al. | |
| 2005/0035640 A1 | 2/2005 | Shinozaki | |
| 2005/0073185 A1 | 4/2005 | Uramichi | |
| 2005/0082892 A1 | 4/2005 | Yamada et al. | |
| 2005/0140196 A1 | 6/2005 | Park et al. | |
| 2005/0146187 A1 | 7/2005 | Volker et al. | |
| 2005/0156454 A1 | 7/2005 | Fast | |
| 2005/0168034 A1 | 8/2005 | Fast | |
| 2005/0231016 A1 | 10/2005 | Kojima | |
| 2005/0264076 A1 | 12/2005 | Uramichi et al. | |
| 2005/0275270 A1 | 12/2005 | Lee | |
| 2006/0012232 A1 | 1/2006 | Coughlin et al. | |
| 2006/0055202 A1 | 3/2006 | Bonk et al. | |
| 2006/0145523 A1 | 7/2006 | Yamada | |
| 2006/0170269 A1 | 8/2006 | Oki | |
| 2006/0261657 A1 | 11/2006 | Luo et al. | |
| 2007/0024099 A1 | 2/2007 | Becker et al. | |
| 2007/0040436 A1 | 2/2007 | Oki | |
| 2007/0040437 A1 | 2/2007 | Nagura et al. | |
| 2007/0057558 A1 | 3/2007 | Kojima | |
| 2007/0096529 A1 | 5/2007 | Kojima et al. | |
| 2007/0102982 A1 | 5/2007 | Yamada et al. | |
| 2007/0108825 A1 | 5/2007 | Yamada et al. | |
| 2007/0132294 A1 | 6/2007 | Yamada et al. | |
| 2007/0138854 A1 | 6/2007 | Paing et al. | |
| 2007/0145800 A1 | 6/2007 | Thiel et al. | |
| 2007/0145801 A1 | 6/2007 | Yamada et al. | |
| 2007/0289092 A1 | 12/2007 | Rohee et al. | |
| 2008/0001458 A1 | 1/2008 | Hoshihara et al. | |
| 2008/0048478 A1 | 2/2008 | Koumura | |
| 2008/0073961 A1 | 3/2008 | Wahls et al. | |
| 2008/0093906 A1 | 4/2008 | Gruson | |
| 2008/0093907 A1 | 4/2008 | Nag et al. | |
| 2008/0174163 A1 | 7/2008 | Kojima et al. | |
| 2008/0197687 A1 | 8/2008 | Luo et al. | |
| 2008/0203798 A1 | 8/2008 | Kienke et al. | |
| 2008/0203799 A1 | 8/2008 | Yamada | |
| 2008/0211285 A1 | 9/2008 | Ishihara et al. | |
| 2008/0231103 A1 | 9/2008 | Rohee | |
| 2008/0238171 A1 | 10/2008 | Kojima et al. | |
| 2008/0303331 A1 | 12/2008 | Heo | |
| 2009/0001797 A1 | 1/2009 | Neumann | |
| 2009/0066138 A1 | 3/2009 | Reubeuze et al. | |
| 2009/0085391 A1 | 4/2009 | Peters et al. | |
| 2009/0200850 A1 | 8/2009 | Heo | |
| 2009/0236892 A1 | 9/2009 | Cillierre et al. | |
| 2009/0243360 A1 | 10/2009 | Tarusawa et al. | |
| 2009/0243361 A1 | 10/2009 | Tarusawa et al. | |
| 2009/0243363 A1 | 10/2009 | Tarusawa et al. | |
| 2009/0302658 A1 | 12/2009 | Fassbender et al. | |
| 2010/0026071 A1 | 2/2010 | Ohba | |
| 2010/0033004 A1 | 2/2010 | Reubeuze | |
| 2010/0109408 A1 | 5/2010 | Ohba | |
| 2010/0139425 A1 | 6/2010 | Schulz et al. | |
| 2010/0194164 A1 | 8/2010 | Cha et al. | |
| 2010/0194165 A1 | 8/2010 | Iguchi | |
| 2012/0277050 A1 | 11/2012 | Jokiel et al. | |
| 2013/0161994 A1* | 6/2013 | Ito | B60N 2/236 297/367 P |
| 2015/0035337 A1* | 2/2015 | Yamada | B60N 2/2356 297/367 P |

FOREIGN PATENT DOCUMENTS

| | | |
|---|---|---|
| DE | 19814225 A1 | 10/1998 |
| DE | 19918864 A1 | 10/1999 |
| DE | 19904300 C1 | 8/2000 |
| DE | 10105282 A1 | 8/2002 |
| DE | 10305407 A1 | 8/2004 |
| DE | 10 2008 028 094 A1 | 12/2009 |
| DE | 10 2009 036 249 A1 | 5/2010 |
| DE | 1 1 2009 000 118 T5 | 2/2011 |
| DE | 103 17 926 B4 | 6/2011 |
| EP | 0694434 A1 | 1/1996 |
| EP | 0 770 514 B1 | 5/1999 |
| EP | 1676502 A2 | 7/2006 |
| GB | 2449383 A | 11/2008 |
| JP | 2002-119349 A | 4/2002 |
| JP | 2002119352 A | 4/2002 |
| JP | 2003000379 A | 1/2003 |
| JP | 2004081345 A | 3/2004 |
| JP | 2004245942 A | 9/2004 |
| JP | 2005304717 A | 11/2005 |
| JP | 2006014999 A | 1/2006 |
| KR | 10-0601809 B1 | 7/2006 |
| KR | 10-0817000 B1 | 3/2008 |
| KR | 10-2009-0035633 A | 4/2009 |
| WO | WO-00/44582 A1 | 8/2000 |
| WO | WO-02/079000 A1 | 10/2002 |
| WO | WO-2007/034683 A1 | 3/2007 |

(56) References Cited

FOREIGN PATENT DOCUMENTS

| WO | WO-2007115601 A1 | 10/2007 |
|----|------------------|---------|
| WO | WO-200846004 A1  | 4/2008  |
| WO | WO-201048383 A1  | 4/2010  |

OTHER PUBLICATIONS

Final Office Action in U.S. Appl. No. 13/099,594, dated May 7, 2013.
First Office Action for Chinese Application No. 200980102127.1, dated Sep. 13, 2012. English translation provided by AIPT Patent, Trademark & Law Office.
First Office Action regarding Chinese Patent Application No. 200980103781.4, dated Jul. 3, 2012. English translation provided by AIPT Patent Trademark & Law Office.
International Search Report and Written Opinion of the International Searching Authority for International Application No. PCT/US09/31255, dated Feb. 23, 2009.
International Search Report for International Application No. PCT/US09/33067, dated Feb. 29, 2012.
Non-Final Office Action in U.S. Appl. No. 12/855,427, dated Jul. 12, 2013.
Non-Final Office Action in U.S. Appl. No. 13/049,360, dated Jun. 25, 2013.
Non-Final Office Action in U.S. Appl. No. 13/099,594, dated Oct. 24, 2012.
Non-Final Office Action regarding U.S. Appl. No. 13/511,999, dated Feb. 26, 2014.
Notification of Reason(s) for Refusal for Japanese Patent Application No. 2010-543276, dated Sep. 5, 2012. English translation provided by Maeda & Suzuki.
Office Action of the German Patent and Trademark Office for Application No. 10 2011 015 139.7, dated Aug. 14, 2012. English translation provided by Witte, Weller & Partner.
Second Office Action for Chinese Application No. 200980102127.1, dated Apr. 15, 2013. English translation provided by AIPT Patent, Trademark & Law Office.
Second Office Action regarding Chinese Patent Application No. 200980103781.4, dated Jan. 28, 2013. English translation provided by AIPT Patent Trademark & Law Office.
Third Office Action regarding Chinese Patent Application No. 200980103781.4, dated Aug. 13, 2013. English translation provided by AIPT Patent, Trademark & Law Office.
Written Opinion of the International Searching Authority for International Application No. PCT/US09/33067, dated Feb. 29, 2012.

* cited by examiner

LATCH MECHANISM WITH LOCKING FEATURE

CROSS-REFERENCE TO RELATED APPLICATION

This application claims the benefit of U.S. Provisional Application No. 62/010,687, filed on Jun. 11, 2014. The entire disclosure of the above application is incorporated herein by reference.

FIELD

The present disclosure relates to a latch mechanism with a locking feature for a seat assembly.

BACKGROUND

The statements in this section merely provide background information related to the present disclosure and may not constitute prior art.

Recliner and latch mechanisms are conventionally used in seat assemblies to permit selective adjustment of a seatback relative to a seat bottom. One such latch mechanism is a round-recliner mechanism, which typically includes a guide plate fixed to a seat bottom, a ratchet plate attached to a seatback, and a locking mechanism disposed generally between the guide plate and the ratchet plate. The ratchet plate typically includes a plurality of teeth disposed around the circumference of the ratchet plate. The locking mechanism typically includes a plurality of complementary teeth that can be brought into and out of engagement with the teeth of the ratchet plate to selectively prevent rotation of the ratchet plate relative to the guide plate and, thus, selectively prevent rotation of the seatback relative to the seat bottom.

SUMMARY

This section provides a general summary of the disclosure, and is not a comprehensive disclosure of its full scope or all of its features.

A latch mechanism is provided and may include a first plate, a second plate, a cam rotatably supported between the first plate and the second plate, and a plurality of pawls rotatably supported between the first plate and the second plate. The plurality of pawls are movable from an unlocked state to a locked state by the cam. The plurality of pawls each include a plurality of discrete locking members extending toward and received by respective notches formed in one of the first plate and the second plate. In some configurations, the latch mechanism may include a pair of locking projections disposed at opposite ends of the at least one pawl and are separated by a valley extending therebetween.

A seat assembly is provided and may include a seatback, a seat bottom rotatably supporting the seatback, and a latch mechanism disposed at a junction of the seatback and the seat bottom. The latch mechanism selectively prevents rotation of the seatback relative to the seat bottom and may include a first plate, a second plate, a cam rotatably supported between the first plate and the second plate, and a plurality of pawls. The plurality of pawls are rotatably supported between the first plate and the second plate and are movable from an unlocked state to a locked state by the cam. The plurality of pawls each include a plurality of discrete locking members extending toward and received by respective notches formed in one of the first plate and the second plate. The locking projections are disposed at opposite ends of the at least one pawl and are separated by a valley extending therebetween.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
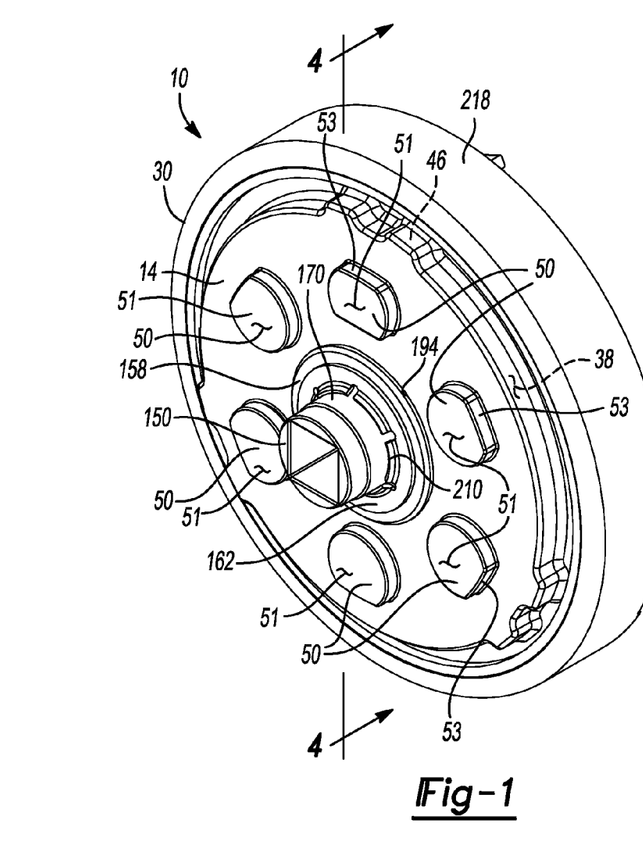
FIG. 1 is a perspective view of a latch mechanism in accordance with the principles of the present disclosure.
Figure 2:
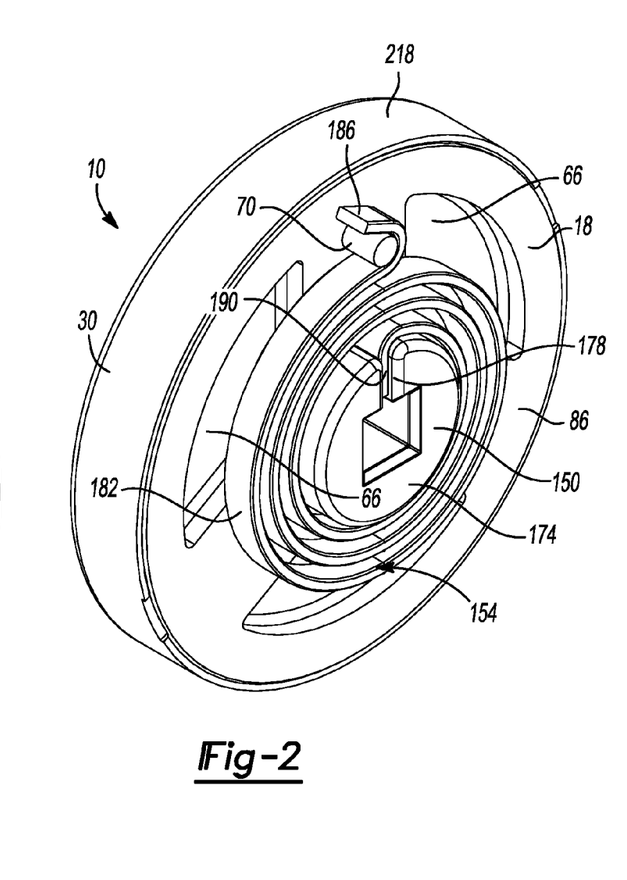
FIG. 2 is a perspective view of the latch mechanism of FIG. 1.
Figure 3:
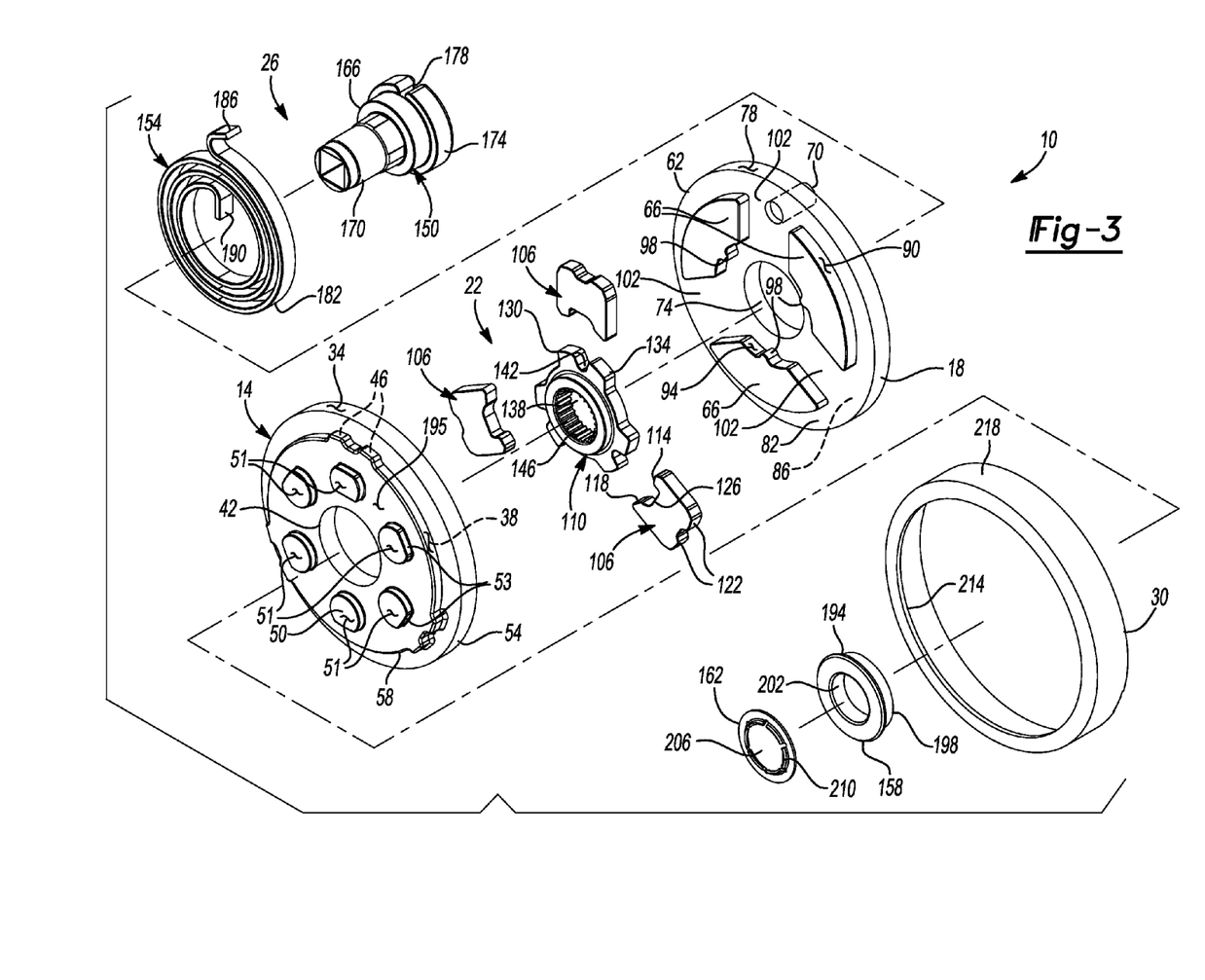
FIG. 3 is an exploded view of the latch mechanism of FIG. 1.

With reference to FIGS. 1-3, a latch mechanism 10 is provided and may include a locking plate 14, a guide plate 18, a locking mechanism 22, an actuation mechanism 26, and an encapsulation ring 30. The locking mechanism 22 is disposed generally between the locking plate 14 and the guide plate 18 to selectively prevent rotation of the locking plate 14 relative to the guide plate 18. The actuation mechanism 26 is in communication with the locking mechanism 22 to move the locking mechanism 22 between an unlocked state permitting rotation of the locking plate 14 relative to the guide plate 18 and a locked state restricting rotation of the locking plate 14 relative to the guide plate 18, as will be described below.

With particular reference to FIG. 3, the locking plate 14 includes a generally circular shape having an outer surface 34, an inner surface 38, a central aperture 42, and a series of notches 46 formed in the inner surface 38. The inner surface 38 may be generally circular in shape and concentric with the outer surface 34. The locking plate 14 may also include one or more attachment features 50 for attaching the locking plate 14 to an external structure such as a seat frame (not shown). The attachment features 50 protrude from the locking plate 14 and are used to attach the locking plate 14 to the seat frame (not shown) by providing a series of surfaces 51 that may be welded or otherwise attached to the seat frame. Each attachment feature 50 may additionally include a flat 53 or other locating feature that helps properly position the locking plate 14 relative to the seat frame. The locking plate 14 may include a stepped profile, whereby the outer surface 34 is formed on an exterior surface of a first-stepped portion 54, and the inner surface 38 and central aperture 42 are formed on a second-stepped portion 58.

The guide plate 18 may include a generally circular shape having a main body 62, a series of projections 66, a spring post 70, and a central aperture 74 formed through the main body 62. The main body 62 may include an outer surface 78 formed around the circumference of the main body 62, a front face 82, and a back face 86. The spring post 70 may extend from the back face 86 of the main body 62. The projections 66 may extend from the front face 82 of the main body 62 and are generally arcuate in shape with an outer circumferential surface 90 and an inner surface 94. The outer circumferential surface 90 is of a diameter similar to, but less than, the diameter of the inner surface 38 of the locking plate 14. Accordingly, the projections 66 may be received within the second-stepped portion 58 of the locking plate 14 and the outer circumferential surfaces 90 may slidably engage the inner surface 38 of the locking plate 14.

The inner surface 94 of the projections 66 may include a stop 98 that protrudes radially inward from the inner surface 94, toward the central aperture 74. The projections 66 cooperate to form a plurality of guide recesses 102 that support at least a portion of the locking mechanism 22. The guide plate 18 is illustrated as including three (3) equally spaced projections 66 and, thus, three (3) equally spaced guide recesses 102. Once assembled, the locking mechanism 22 may be disposed generally between the locking plate 14 and the guide plate 18.

The locking mechanism 22 includes at least one pawl 106 and a cam 110. The example provided includes three (3) equally spaced pawls 106 slidably disposed in respective guide recesses 102. Each pawl 106 may include a pair of engagement members 114, 118 and a pair of locking members 122 formed generally on an opposite end of the pawls 106 relative to the engagement members 114, 118. The engagement members 114, 118 cooperate to form an engagement recess 126 therebetween. Once assembled, the pawls 106 are slidably received within a respective guide recess 102 formed between adjacent projections 66 of the guide plate 18 to guide movement of the pawls 106 relative to the guide plate 18.

The cam 110 includes three (3) pairs of cam projections 130, 134 and a central aperture 138. The cam projections 130, 134 extend generally radially outward from the cam 110. The cam projections 130, 134 cooperate to form a cam recess 142 between each of the pair of cam projections 130, 134. Each cam projection 130, 134 cooperates with a respective one of the engagement members 114, 118 of the pawls 106, as will be described in detail below. The central aperture 138 of the cam 110 may be keyed or, alternatively, may include an inner, splined surface 146 that couples the cam 110 to the actuation mechanism 26.

The actuation mechanism 26 may include a pivot 150, a biasing member 154, a pivot cap 158, and a cap ring 162. The pivot 150 may include a pivot body 166, a generally cylindrical portion 170, and an outer flange 174 disposed on an opposite end of the pivot 150 from the cylindrical portion 170. The cylindrical portion 170 is received in the central aperture 138 of the cam 110 and cooperates with the keyed or splined surface 146 to attach the pivot 150 to the cam 110 for rotation therewith. The pivot 150 can be fixedly attached to a lever (FIGS. 10 and 11) for actuating rotation of the pivot 150 and cam 110. The outer flange 174 may include a diameter that is larger than the diameter of the cylindrical portion 170 and is larger than the central aperture 74 of the guide plate 18. The outer flange 174 may include a spring slot 178 that cooperates with the biasing member 154 to bias the pivot 150 in the clockwise (CW) direction relative to the view shown in FIG. 4.

The biasing member 154 may be a coil spring and may include a coiled body 182, an outwardly extending arm 186, and an inwardly extending arm 190. The outwardly extending arm 186 may be attached to or otherwise engage the spring post 70 of the guide plate 18, and the inwardly extending arm 190 may be attached to or otherwise engage the spring slot 178 of the outer flange 174 of the pivot 150 (FIG. 2). The biasing member 154, the spring post 70, and the spring slot 178 cooperate to impart a rotational biasing force on the locking mechanism 22 to bias the locking mechanism 22 into the locked state, thereby preventing relative rotation between the locking plate 14 and the guide plate 18. While the biasing member 154 is described as being a coil spring, the biasing member 154 may be any suitable biasing member that provides a biasing force to the pivot 150 such as, for example, a linear spring.

The pivot cap 158 may include an outer lip 194, a cylindrical body 198, and a central aperture 202 formed therethrough once the assembled central aperture 202 of the pivot cap 158 receives the cylindrical portion 170 of the pivot 150 and the cylindrical body 198 is received within the central aperture 42 of the locking plate 14. The outer lip 194 includes a diameter that is larger than the diameter of the central aperture of the locking plate 14 such that the outer lip 194 engages an outer surface 195 (FIG. 3) of the locking plate 14. Engagement between the outer lip 194 and the outer surface 195 is maintained by the cap ring 162.

The cap ring 162 includes a central aperture 206 that receives the cylindrical portion 170 of the pivot 150 and may include a series of locking tabs 210. When assembled, the pivot cap 158 is axially disposed between the outer surface 195 of the locking plate 14 and the outer lip 194 of the cap ring 162. The locking tabs 210 cooperate with the cylindrical portion 170 of the pivot 150 to prevent axial separation of the pivot cap 158 and the pivot 150. The pivot cap 158 may cooperate with the outer flange 174 of the pivot 150 to prevent the guide plate 18 from axially separating from the locking plate 14 when assembled.

The encapsulation ring 30 may be positioned around the main body 62 of the guide plate 18 and the outer surface 34 of the locking plate 14 to maintain engagement between the locking plate 14 and the guide plate 18. The encapsulation ring 30 may include a central aperture 214 and a flange 218. The flange 218 may extend over the outer surface 78 of the guide plate 18 and may at least partially extend over the outer surface 34 of the locking plate 14. In one configuration, the flange 218 may be fixedly attached to the guide plate 18 and to an external mounting bracket (not shown).

Figure 4:
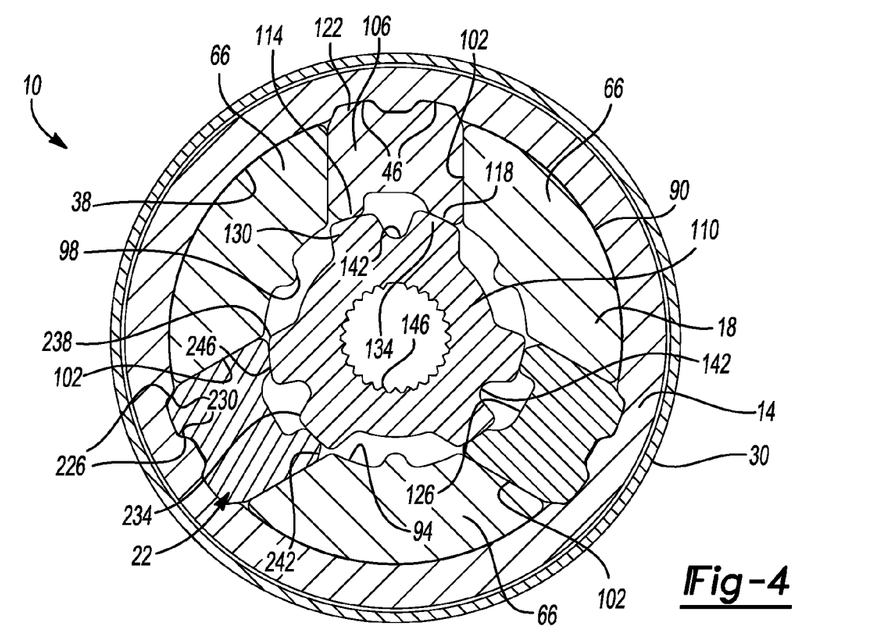
FIG. 4 is a cross-sectional view of the latch mechanism of FIG. 1 taken along line 4-4 of FIG. 1 and shown in a locked state.
Figure 5:
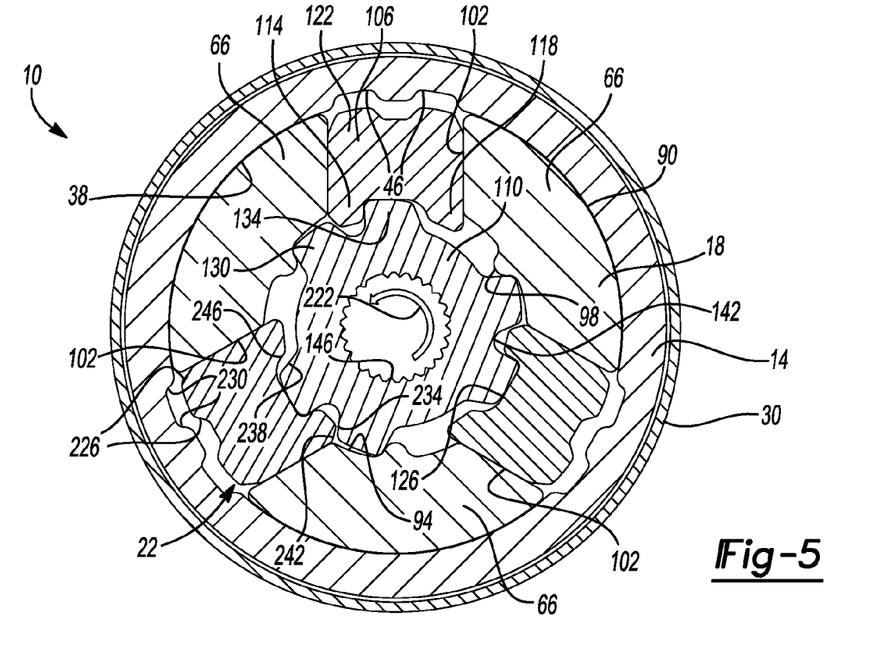
FIG. 5 is a cross-sectional view of the latch mechanism of FIG. 1 taken along line 4-4 of FIG. 1 and shown in an unlocked state.

With particular reference to FIGS. 4 and 5, operation of the latch mechanism 10 will be described in detail. When the latch mechanism 10 is in the locked state (FIG. 4), the pawls 106 are biased into a radially extended position, whereby the locking member 122 of each pawl 106 is in engagement with a corresponding notch 46 of the locking plate 14. In this position, the locking plate 14 is restricted from rotating relative to the guide plate 18 due to engagement between the locking members 122 of the pawls 106 and the notches 46 of the locking plate 14. Each of the engagement members 114, 118 of the pawls 106 cooperate with a respective one of the cam projections 130, 134 of the cam 110 to prevent movement of the pawls 106 in an inward radial direction and, thus, prevent disengagement of the locking members 122 from the notches 46 while in the locked state.

Providing a torque to rotate the cam 110 in an unlocking direction, illustrated by arrow 222 (FIG. 5), moves the latch mechanism 10 to the unlocked state (FIG. 5). In the unlocked state, the pawls 106 are not biased into the radially extended position and are free to move radially inward to disengage the notches 46. In this position, the locking plate 14 is free to rotate relative to the guide plate 18.

Each of the locking members 122 includes side locking surfaces 226 and each of the notches 46 includes complimentary side ramp surfaces 230. The side locking surfaces 226 and side ramp surfaces 230 are of a profile such that, when the cam 110 is in the unlocked state, rotational movement of the locking plate 14 relative to the guide plate 18 causes the side ramp surfaces 230 to exert a radially inward force on the side locking surfaces 226. This radially inward force causes the side locking surfaces 226 and side ramp surfaces 230 to slide relative to each other to move the pawls 106 toward a radially retracted position (FIG. 5). In the example provided, the side locking surfaces 226, and side ramp surfaces 230 are at an angle of approximately twenty-five degrees) (25°), though other angles may be used. In this position, the cam recess 142 receives the engagement member 114 therein and the engagement recess 126 receives the cam projection 134 to provide clearance to allow for the pawl 106 to move into the retracted position. The stop 98 may act on the cam projection 130 to prevent the cam 110 from rotating a predetermined amount in the direction indicated by arrow 222.

Each cam projection 130, 134 includes a side engagement ramp 234, 238 and each engagement member 114, 118 includes a complimentary side engagement surface 242, 246. The side engagement ramps 234, 238 and side engagement surfaces 242, 246 are of a profile such that, when the pawls 106 are in the retracted position and the cam 110 is rotated in a locking direction, opposite arrow 222, the rotational movement of the cam 110 causes the side engagement ramps 234, 238 to exert a radially outward force on the side engagement surfaces 242, 246. This radially outward force causes the side engagement ramps 234, 238 and side engagement surfaces 242, 246 to slide relative to each other to move the pawls 106 toward the radially extended position.

Figure 10:
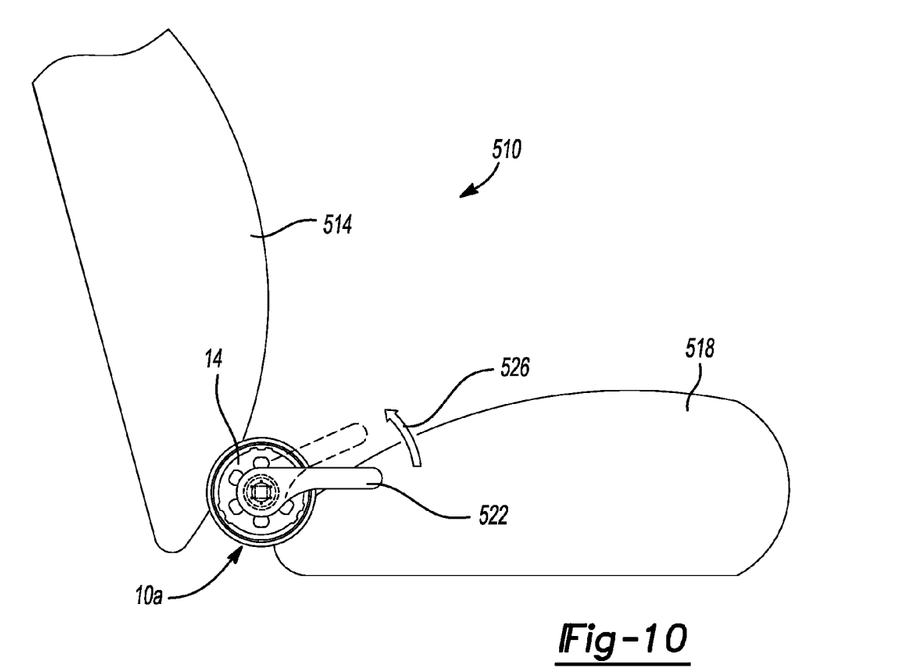
FIG. 10 is a side view of a seat assembly incorporating the latch mechanism of FIG. 1 and shown in an upright and usable position.

The biasing member 154 provides a biasing torque on the cam 110 in the direction opposite arrow 222. Thus, releasing the torque applied to the cam 110 with the latch mechanism 10 in the position illustrated in FIG. 5 returns the latch mechanism 10 to the locked state. In the unlocked state, the locking plate 14 is free to rotate relative to the guide plate 18. Once the locking plate 14 is rotated relative to the guide plate 18, the torque applied to the cam 110 can be released and the locking members 122 slide along the inner surface 38 of the locking plate 14. The locking members 122 are then free to slide along the inner surface 38 of the locking plate 14 until the locking members 122 engage another set of the series of notches 46, or return to their originating set of notches 46. In the example provided, the locking plate includes three (3) equally spaced sets of notches 46, allowing the locking plate 14 and guide plate 18 to freely rotate approximately 120 degrees (120°) between locking positions. Thus, as will be appreciated by those skilled in the art, the present design obviates the need for a separate control ring, such as shown in U.S. Pat. No. 8,708,412, to keep the pawls in the unlocked state while the seatback is rotated between an upright use position as shown in FIG. 10 and the fold-flat position shown in FIG. 11.

FIGS. 6-9 illustrate the operation of a latch mechanism 10a of an alternate configuration. The latch mechanism 10a is identical to the latch mechanism 10 described above, except that the locking plate 14a includes an additional set of notches 250. Accordingly, like reference numerals are used hereinafter and in the drawings to identify like components while reference numerals containing a letter extension are used to identify those components that have been modified.

The notches 250 are identical to the notches 46 of the latch mechanism 10. For this reason, only the differences between latch mechanism 10a and latch mechanism 10 will be described in detail. The notches 250 may be spaced relative to the notches 46 such that one of the locking members 122 can be engaged with one of notches 250 while another of locking members 122 can be engaged with an adjacent one of notches 46, as illustrated in FIG. 6.

Figure 6:
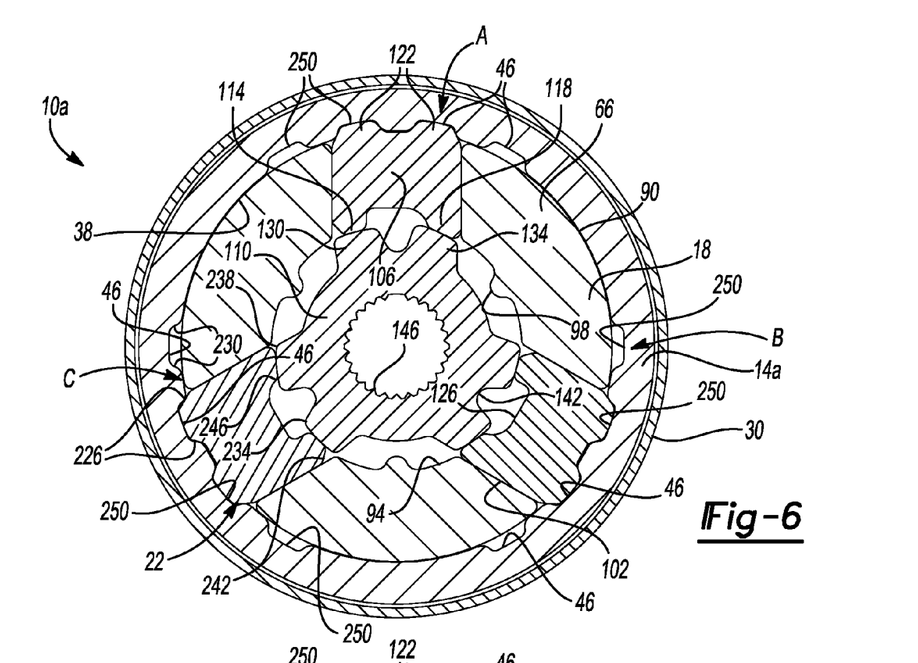
FIG. 6 is a cross-sectional view of another latch mechanism in accordance with the principles of the present disclosure and shown in a locked state and in a first position.

FIG. 6 illustrates the latch mechanism 10a in the locked state where the locking plate 14a has been rotated from an initial or first position—having both locking members 122 engaged in respective notches 46—to a second rotational position. In this position, one the locking members 122 engages one of the notches 250 and another of locking members 122 engages an adjacent one of notches 46. Similar to the locking state described above with reference to FIG. 4, the pawl 106, cam 110, and locking plate 14a cooperate to prevent rotation of the locking plate 14a relative to the guide plate 18.

Figure 7:
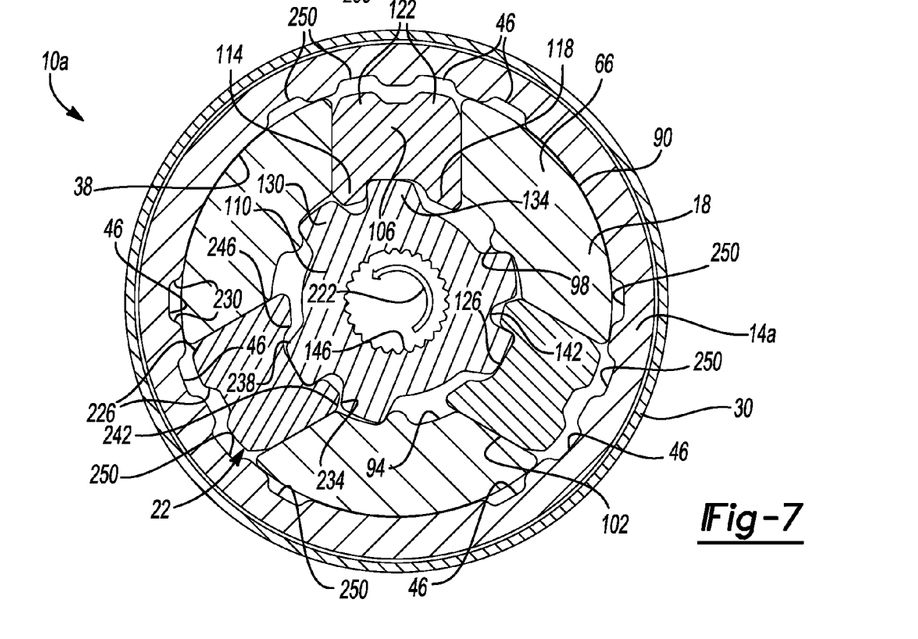
FIG. 7 is a cross-sectional view of the round-latch mechanism of FIG. 6 shown in an unlocked state and in the first position.

FIG. 7 illustrates the latch mechanism 10a in the unlocked state in the second rotational position. Similar to FIG. 5 described above, a torque may be applied to the cam 110 in the direction indicated by arrow 222, allowing the pawls 106 to move to a retracted position such that the locking plate 14a is free to rotate relative to the guide plate 18. From this position, the locking plate 14a may be rotated in the direction of arrow 254 to move the latch mechanism 10a to a third rotational position, as illustrated in FIG. 8, or may be rotated opposite direction 254 to return the latch mechanism 10a to the initial, or first position.

Figure 8:
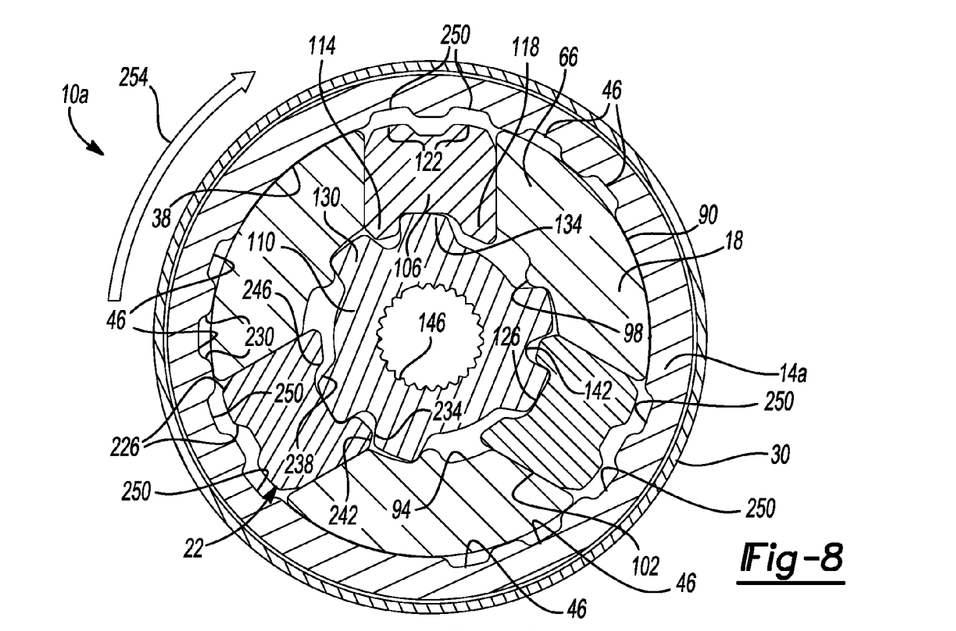
FIG. 8 is a cross-sectional view of the latch mechanism of FIG. 6 shown in the unlocked state and in a second position.

FIG. 8 illustrates the latch mechanism 10a in the unlocked state and at the third rotational position as a result of a torque being applied to the locking plate 14a in the direction of arrow 254. In this state and position, the cam 110 can be rotated in the direction of arrow 258 to cause the latch mechanism 10a to move to the locked state illustrated in FIG. 9. Alternatively, the locking plate 14 may be rotated farther in the direction of arrow 254 to allow the locking members 122 to slide along the inner surface 38 of the locking plate 14 until engaging the next set of notches 46, or the locking plate 14a may be rotated in the direction opposite arrow 254 to return the latch mechanism 10a to the first or second rotational positions.

Figure 9:
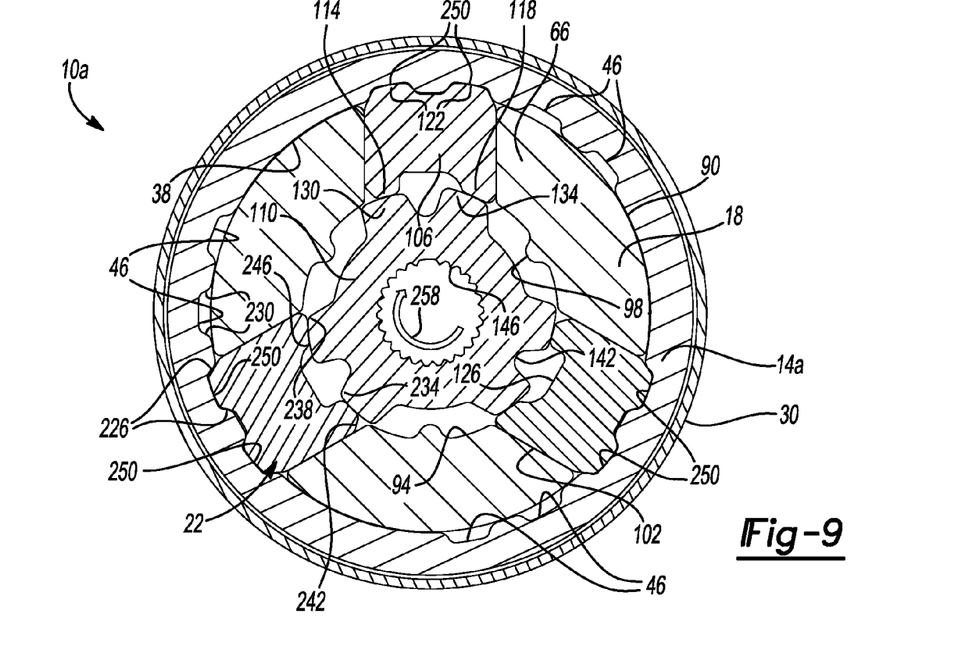
FIG. 9 is a cross-sectional view of the latch mechanism of FIG. 6 shown in the locked state and in the second position.

FIG. 9 illustrates the latch mechanism 10a in the third rotational position and in the locked state. In this position, the locking members 122 are engaged with notches 250. Similar to the locking state described above with reference to FIGS. 4 and 6, the pawl 106, cam 110, and locking plate 14a cooperate to prevent the rotation of the locking plate 14a relative to the guide plate 18.

As described, the latch mechanism 10a may be positioned essentially in one of three positions such that the locking members 122 are received within a pair of notches 250, are received within a pair of notches 46, or are positioned such that one of the locking members 122 is received within a notch 250 while the other locking member 122 is received in a notch 46. These three positions essentially illustrate three different rotational positions of the locking plate 14a relative to the guide plate 18. In short, cooperation between the locking members 122 and the various notches 46, 250 identify three discrete locking positions of the locking plate 14a relative to the guide plate 18 and, as a result, define three discrete angular positions of the locking plate 14a relative to the guide plate 18.

As shown in FIGS. 6-9 and as labeled in FIG. 6, there are three sets A, B, C of notches 46, 250. While the locking plate 14a may be rotated relative to the guide plate 18 when the locking members 122 are disengaged from the notches 46, 150 to allow the locking plate 14a to be positioned in one of the first position, the second position, or the third position, as described above, the locking plate 14a could also be rotated relative to the guide plate 18 such that the locking members 122 associated with the notches 46, 250 of section A are positioned adjacent to the notches 46, 250 of section C.

For example, when the locking members 122 associated with section A are disengaged from the notches 46, 250, a force may be applied to the locking plate 14a in the direction indicated by arrow 254 in FIG. 8. Rotating the locking plate 14a sufficiently in the direction identified by arrow 254 causes the locking members 122 associated with section A to engage and ride along the inner surface 38 until the locking members 122 encounter the notches 46 associated with section C. Once the locking members 122 associated with section A engage the surface 38, the force applied to the cam 110 can be released and the locking members 122 are once again biased in a direction by the cam 110 in a direction away from the cam 110. Accordingly, when the locking plate 14a is sufficiently rotated in the direction identified by arrow 254 in FIG. 8, the locking members 122 will be received within respective ones of the notches 46 of section C to once again fix a position of the locking plate 14a relative to the guide plate 18.

The rotational position of the notches 46 of section C may be positioned around the locking plate 14a from the notches 46, 250 of section A such that the locking plate 14a is permitted to rotate approximately twenty-five degrees (25°) relative to the guide plate 18. Allowing the locking plate 14a to rotate in such a manner allows the locking plate 14a to be adjusted a greater distance relative to the guide plate 18 as compared to the three discrete positions afforded by the notches 46, 250 associated with the individual sections A, C. As will be described below, permitting the locking members 122 associated with section A to engage the notches 46 associated with section C upon sufficient rotation of the guide plate 14a allows a seatback associated with a seat assembly to be moved from an upright position relative to a seat bottom and into a substantially fold-flat position. Likewise, allowing the locking members 122 to be positioned at three discrete locations within each section A, B, C allows the seatback to be adjusted in one of three discrete positions relative to the seat bottom. Accordingly, the seatback may be adjusted into one of three discrete angular positions relative to the seat bottom.

While the locking members 122 of section A are described as engaging the notches 46 of section C, it should be noted that the locking members 122 associated with section B will engage the notches 46 associated with section A when the locking plate 14a is sufficiently rotated to allow the locking members 122 associated with section A to engage the notches 46 associated with section C. Further, the locking members 122 associated with section C likewise engage the notches 46 associated with section B upon such rotation of the locking plate 14a.

Figure 11:
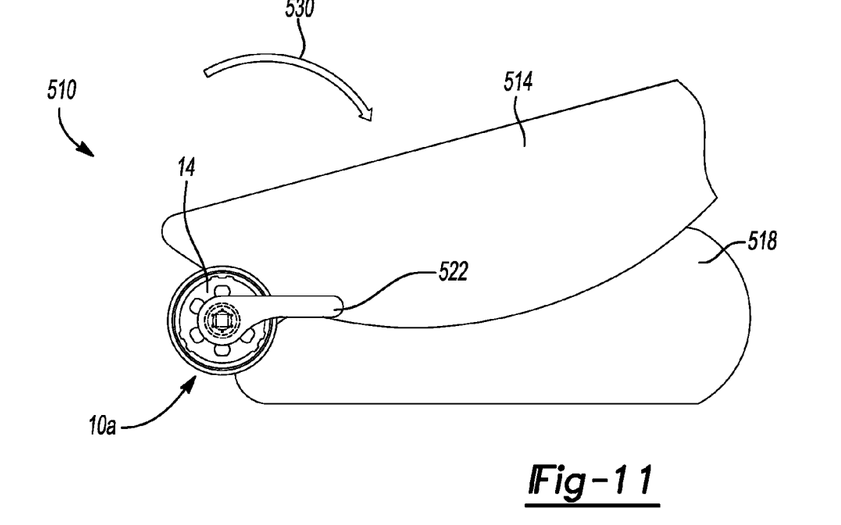
FIG. 11 is a side view of the seat assembly of FIG. 10 shown in a folded position.

FIGS. 10 and 11 illustrate a seat assembly 510 including a seatback 514, seat bottom 518, and the latch mechanism 10a. While the seat assembly 510 is described and shown as being associated with the latch mechanism 10a, the seat assembly 510 could alternatively be associated with the latch mechanism 10.

The guide plate 18 may be fixed to the seat bottom 518, and the locking plate 14a may be fixed to the seatback 514. Accordingly, when rotation between the plates 14a, 18 is permitted, rotation of the seatback 514 relative to the seat bottom 518 is likewise permitted. The latch mechanism 10a is actuated by a lever 522. Lever 522 may be fixedly attached to the pivot 150 to rotate the pivot 150 and, thus, the cam 110 as described above with regard to the latch mechanisms 10 and 10a.

Rotating the lever 522 in the direction indicated by arrow 526 moves the latch mechanism 10a to the unlocked state. In the unlocked state, the seatback 514 is free to move relative to the seat bottom 518 and may move in the direction indicated by arrow 530. In the example provided, the latch mechanism 10a allows the seat assembly 510 to be moved to a more compact state without providing for a multitude of incremental positions.

When the seatback 514 is in the positions shown in FIG. 10 relative to the seat bottom 518, a force may be applied to the lever 522 to move the latch mechanism 10a from the locked state to the unlocked state. In this position, the locking members 122 may disengage the respective notches 46, 250 to allow an angular position of the seatback 514 relative to the seat bottom 518 to be adjusted. For example, if the locking members 122 are received within the notches 250 of the respective sections A, B, C (FIG. 9), a force may be applied to the cam 110 to allow the cam projections 130, 134 to respectively move to the recess adjacent to the stop 98 and to the recess defined between the engagement members 114, 118 to provide sufficient clearance for the pawls 106 to move into the unlocked state (FIG. 8). At this point, a rotational force may be applied to the locking plate 14a to rotate the locking plate 14a in the direction indicated by arrow 254 until the pawls 106 are positioned such that the locking members 122 oppose the notches 46 or, alternatively, that one locking member 122 opposes a notch 250 and the other locking member 122 opposes a notch 46. Once the desired angular position of the locking plate 14a and, thus, the seatback 514 is achieved, the force applied to the cam 110 via the actuation handle 522 may be released, thereby allowing the cam 110 to rotate in the direction indicated by arrow 258 (FIG. 9) under the force imparted thereon by the biasing member 154 to allow the pawls 206 to move into the locked state. At this point, the position of the locking plate 14a relative to the guide plate 18 is fixed and, accordingly, the angular position of the seatback 514 relative to the seat bottom 518 is fixed.

When the seatback 514 is moved to the fold-flat position shown in FIG. 11, a force is applied to the actuation lever 522, as shown in FIG. 10. Once again, the pawls 206 disengage the notches 46, 250 of the respective sections A, B, C and a rotational force is applied to the locking plate 14a. The rotational force applied to the locking plate 14a causes the locking plate 14a to rotate relative to the pawls 206 such that the locking pawls 206 originally associated with sections A, B, C are now associated with a different section A, B, C. For example, if the locking pawls 206 associated with section A are removed from the notches 250 (FIG. 9), a force may be applied to the locking plate 14a to rotate the locking plate 14a relative to the locking pawls 206. The locking plate 14a may be rotated until the pawls 206 originally associated with section A are now associated and positioned relative to section C and are received within the notches 46 of section C. At this point, the seatback 514 is positioned relative to the seat bottom 518 such that the seatback 514 is in a substantially fold-flat position. Once the force applied to the actuation lever 522 is released, the cam 118—via the force imparted thereon by the biasing member 154—once again returns the pawls 206 to the locked state, thereby fixing a position of the locking plate 14a relative to the guide plate 18. Fixing a position of the locking plate 14a relative to the guide plate 18 likewise fixes a position of the seatback 514 relative to the seat bottom 518.

Figure 12:
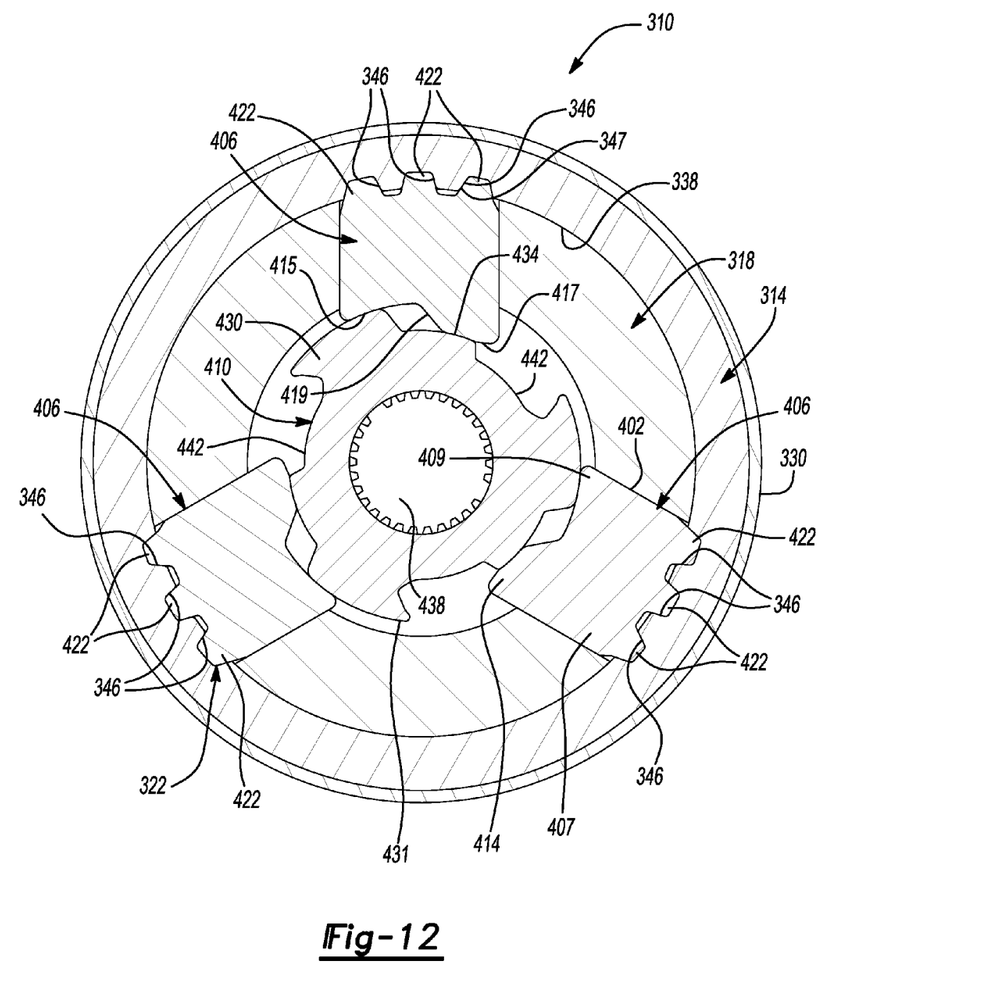
FIG. 12 is a cross-sectional view of another latch mechanism in accordance with the principles of the present disclosure and shown in a locked state.
Figure 13:
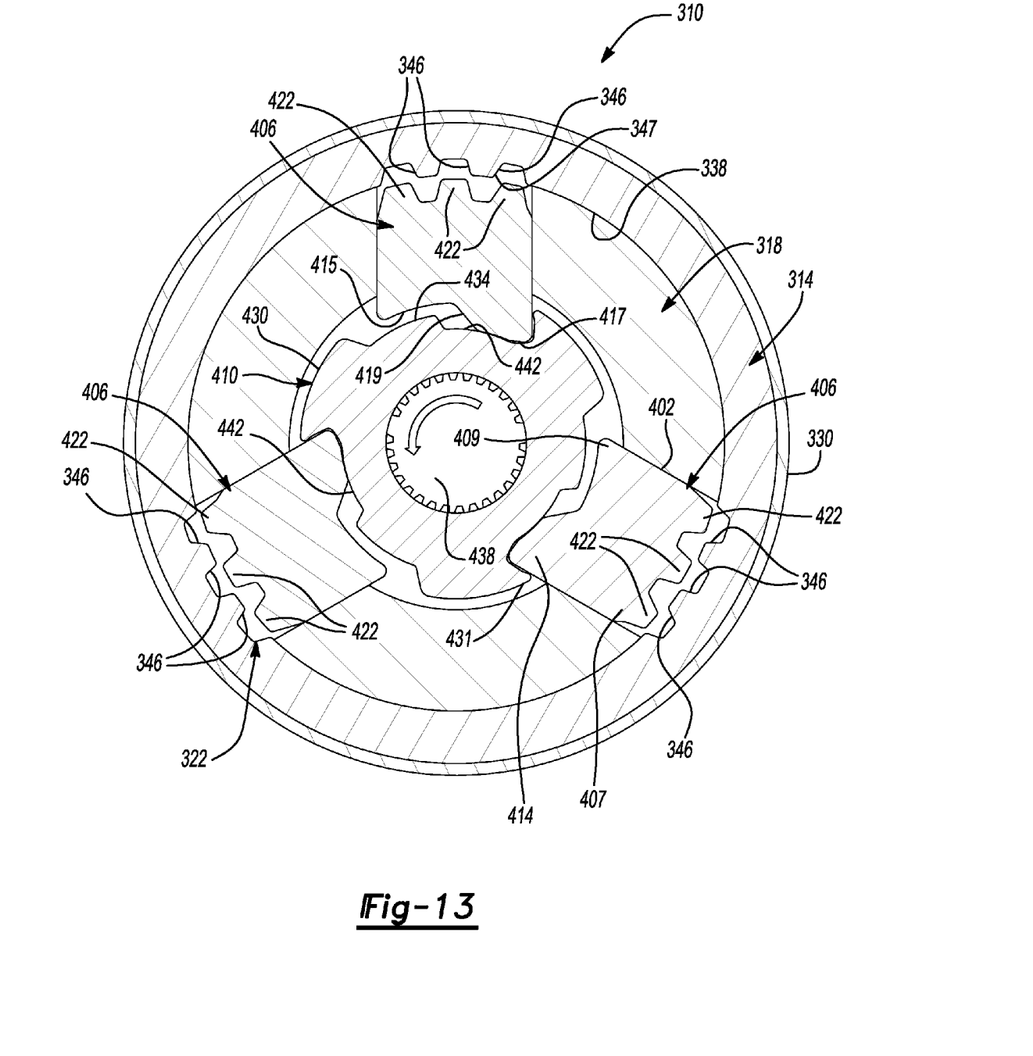
FIG. 13 is a cross-sectional view of another latch mechanism in accordance with the principles of the present disclosure and shown in an unlocked state.

With reference to FIGS. 12 and 13, another latch mechanism 310 is provided that could be incorporated into the seat assembly 510 described above in the place of the latch mechanism 10 or 10a. The structure and function of the latch mechanism 310 may be similar to identical to that of the latch mechanism 10 or 10a described above, apart from any exceptions described herein and/or shown in the figures. Therefore, similar features may not be described again in detail.

The latch mechanism 310 may include a locking plate 314, a guide plate 318, a locking mechanism 322, and an encapsulation ring 330. An actuation mechanism (not shown; similar to the actuation mechanism 26 described above) may move the locking mechanism 322 between a locked state (FIG. 12) and an unlocked state (FIG. 13). The locking plate 314 may include sets of notches 346 formed in an inner surface 338 thereof. In the particular configuration shown in FIGS. 12 and 13, the locking plate 314 includes three sets of three notches 346. Each of the notches 346 may have tapered surfaces 347.

The guide plate 318 may include a plurality of guide recesses 402 that support at least a portion of the locking mechanism 322. In the particular configuration shown in FIGS. 12 and 13, the guide plate 318 includes three equally spaced recesses 402. Once assembled, the locking mechanism 322 may be disposed generally between the locking plate 314 and the guide plate 318.

The locking mechanism 322 may include one or more pawls 406 and a cam 410. The example provided includes three equally spaced pawls 406 slidably disposed in respective guide recesses 402 formed in the guide plate 318. A first end 407 of each pawl 406 may include a plurality of locking members 422 that can be received in corresponding notches 346 in the locking plate 314. Each of the locking members 422 may include tapered surfaces. A second end 409 of each pawl 406 may include an engagement member 414 protruding therefrom. The engagement member 414 defines a stepped surface including a first end surface 415, a second end surface 417 and a ramped surface 419 extending between the first and second end surfaces 415, 417.

The cam 410 may include three pairs of cam projections 430, 434 and a central aperture 438. The cam projections 430, 434 extend generally radially outward from the cam 410. Cam recesses 442 formed in the cam 410 separate the pairs of cam projections 430, 434 from each other. As shown in FIG. 12, the cam projections 430, 434 contact corresponding ones of the first and second end surfaces 415, 417 of the pawls 406 to maintain the pawls in the locked state. As shown in FIG. 13, the cam 410 can be rotated in a counterclockwise direction (when viewed from the frame of reference of FIG. 12) to allow the lock mechanism 322 to move into the unlocked state. That is, to move the lock mechanism 322 into the unlocked state, the cam 410 is rotated to a position such that the pawls 406 can slide radially inward so that the second end surfaces 417 of the pawls 406 can be received in the cam recesses 442 and the locking members 422 of the pawls 406 can be moved out of engagement with the notches 346 in the locking plate 314. In some configurations, the pawls 406 can be spring-biased toward the unlocked state. As shown in FIGS. 12 and 13, the first cam projections 430 may include pointed tips 431 adjacent the cam recesses 442. Interference between tips 431 and the sides of the pawls 406 may limit a range of rotational motion of the cam 410 in the counterclockwise direction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A latch mechanism comprising:
    a generally circular first plate having only three sets of notches formed 120° apart in a radially inward facing circumferential surface thereof;
    a generally circular second plate having guide channels formed on a surface thereof confronting said first plate;
    one of said first plate and said second plate being rotatable relative to the other of said first plate and said second plate;
    a cam rotatably supported between said first plate and said second plate, and rotatable between a lock position and a release position;
    only three pawls angularly positioned 120° apart and slidably positioned in said guide channels, each of said pawls having radially outward extending angularly spaced locking members confronting said radially inward facing circumferential surface of said first plate;
    wherein said pawls are movable radially within said guide channels between an unlocked position wherein said locking members are disengaged from said sets of notches and a locked position wherein their respective locking members are received within respective ones of said sets of notches;
    wherein each of said pawls has only three or fewer spaced apart locking members;
    wherein said radially inward facing circumferential surface of said first plate is smooth between said three sets of notches thereby forming three smooth surface regions;
    wherein the angular range spanned by all of the locking members of each of said pawls is less than the angular range of each of said smooth surface regions;
    wherein said cam has a plurality of angularly spaced apart and radially outwardly extending cam projections that are configured to engage radially inwardly extending engagement surfaces formed on each of said pawls when said cam is rotated into said lock position to thereby drive said pawls radially outwardly into said locked position;
    wherein said cam projections are disengaged from said engagement surfaces on said pawls when said cam is rotated from said lock position to said release position; and further
    wherein each of said locking members includes a tapered surface and each of said notches includes a corresponding opposed tapered surface, said tapered surfaces being configured so that, once said cam has been rotated to said release position, the rotation of one of said first plate and said second plate relative to the other of said first plate and said second plate causes said pawls to move radially inward from said locked position to said unlocked position.

2. The latch mechanism of claim 1, wherein each of said three sets of notches is angularly located and correspondingly spaced-apart to receive the respective locking members of one of said pawls.

3. The latch mechanism of claim 2, wherein each of said three sets of notches consists of three or fewer notches.

4. The latch mechanism of claim 2, wherein
    said locking mechanism further comprises a biasing member for biasing said cam into said lock position.

5. The latch mechanism of claim 1, wherein the locking members of said pawls are receivable within respective ones of said sets of notches when said first and second plates are relatively positioned in a first angular use position and in a second angular fold-flat position rotationally spaced from said first angular use positions.

6. The latch mechanism of claim 5, wherein the locking members of said pawls are configured to engage and slide along said smooth surface regions when one of said first and second plates is rotated relative to the other between said first use position and said second fold-flat position.

7. The latch mechanism of claim 6, wherein said pawls are maintained in said unlocked position when said locking members are engaged with said smooth surface regions.

8. The latch mechanism of claim 1 wherein said tapered surfaces are formed at an angle of approximately 25°.

9. A latch mechanism comprising:
    a generally circular first plate having notches formed in a radially inward facing circumferential surface thereof;
    a second generally circular plate having guide channels formed on a surface thereof confronting said first plate;
    one of said first plate and said second plate being rotatable relative to the other of said first plate and said second plate;
    a cam rotatably supported between said first plate and said second plate and rotatable between a lock position and a release position;
    a plurality of pawls slidably positioned in said guide channels and having radially outward extending angularly spaced locking members confronting said radially inward facing circumferential surface of said first plate;
    wherein said pawls are movable radially within said guide channels between an unlocked position wherein said locking members are disengageable from said notches and a locked position wherein their respective locking members are received within respective ones of said notches;

wherein each of said pawls has only three or fewer spaced-apart locking members;

wherein said cam has a plurality of angularly spaced apart and radially outwardly extending cam projections that are configured to engage radially inwardly extending engagement surfaces formed on each of said pawls when said cam is rotated into said lock position to thereby drive said pawls radially outwardly into said locked position;

wherein said cam projections are disengaged from said engagement surfaces on said pawls when said cam is rotated from said lock position to said release position; and further wherein each of said locking members includes a tapered surface and each of said notches includes a corresponding opposed tapered surface, said tapered surfaces being configured so that, once said cam has been rotated to said release position, the rotation of one of said first plate and said second plate relative to the other of said first plate and said second plate causes said pawls to move radially inward from said locked position to said unlocked position.

10. The latch mechanism of claim 9, wherein each of said locking members has the same radial width.

11. The latch mechanism of claim 10, wherein said plurality of pawls consists of only three pawls angularly positioned 120° apart.

12. The latch mechanism of claim 11, wherein said first plate has only three sets of notches formed in said radially inward facing circumferential surface, with each of said three sets of notches angularly located and correspondingly spaced-apart to receive the respective locking members of one of said pawls.

13. The latch mechanism of claim 12, wherein said radially inward facing circumferential surface of said first plate is smooth between said three sets of notches thereby forming three smooth surface regions.

14. The latch mechanism of claim 13, wherein said locking mechanism further comprises a biasing member for biasing said cam into said lock position.

15. The latch mechanism of claim 14, wherein each of said three sets of notches consists of four or fewer notches.

16. The latch mechanism of claim 15, wherein each of said pawls has only two spaced-apart locking members disposed on opposite sides thereof.

17. The latch mechanism of claim 16, wherein the radial width of each of the notches in each of said three sets of notches are correspondingly uniformly sized and spaced apart so that said two spaced-apart locking members of each pawl can be received within any two adjacent notches.

18. The latch mechanism of claim 13, wherein the angular range spanned by all of the locking members of each of said pawls is less than the angular range of each of said smooth surface regions.

19. The latch mechanism of claim 18, wherein the locking members of said pawls are receivable within respective ones of said sets of notches when said first and second plates are relatively positioned in a first angular use position and in a second angular fold-flat position rotationally spaced from said first angular use positions.

20. The latch mechanism of claim 19, wherein the locking members of said pawls are configured to engage and slide along said smooth surface regions when one of said first and second plates is rotated relative to the other between said first use position and said second fold-flat position.

21. The latch mechanism of claim 20, wherein said pawls are maintained in said unlocked position when said locking members are engaged with said smooth surface regions.

22. The latch mechanism of claim 9 wherein said tapered surfaces are formed at an angle of approximately 25°.

\* \* \* \* \*